(12) United States Patent
Wieneke

(10) Patent No.: US 10,474,144 B2
(45) Date of Patent: Nov. 12, 2019

(54) REMOTE INFORMATION COLLECTION, SITUATIONAL AWARENESS, AND ADAPTIVE RESPONSE SYSTEM FOR IMPROVING ADVANCE THREAT AWARENESS AND HAZARDOUS RISK AVOIDANCE

(71) Applicant: The United States of America as represented by the Secretary of the Navy, Crane, IN (US)

(72) Inventor: Garry Wieneke, Montgomery, IN (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 184 days.

(21) Appl. No.: 15/455,802

(22) Filed: Mar. 10, 2017

(65) Prior Publication Data

US 2018/0032071 A1    Feb. 1, 2018

Related U.S. Application Data

(60) Provisional application No. 62/369,364, filed on Aug. 1, 2016.

(51) Int. Cl.
*G05D 1/00* (2006.01)
*G05D 1/02* (2006.01)

(52) U.S. Cl.
CPC .......... *G05D 1/0027* (2013.01); *G05D 1/0038* (2013.01); *G05D 1/0044* (2013.01); *G05D 1/0214* (2013.01); *G05D 2201/0209* (2013.01)

(58) Field of Classification Search
CPC .. G05D 1/0027; G05D 1/0038; G05D 1/0044; G05D 1/0214; G05D 2201/0209
See application file for complete search history.

(56) References Cited

U.S. PATENT DOCUMENTS

| | | | |
|---|---|---|---|
| 5,554,983 | A | 9/1996 | Kitamura et al. |
| 5,757,287 | A | 5/1998 | Kitamura et al. |

(Continued)

OTHER PUBLICATIONS https://www.mathworks.com/discovery/pattern-recognition.html; Pattern Recognition—MATLAB & Simulink; printed Mar. 10, 2017; 4 pages.

(Continued)

*Primary Examiner* — Sze-Hon Kong
(74) *Attorney, Agent, or Firm* — Naval Surface Warfare Center, Crane Division; Christopher A. Monsey

(57) ABSTRACT

An adaptive situational awareness, decision support, and automated response system operable to receive sensor data or situational awareness data for a region of interest along or in advance of a path of travel of a vehicle obtained from at least a mobile reconnaissance sensor platform and select/execute one or more response programming or plans to operate one or more vehicle equipment items, e.g., a remote interaction, control or jamming system, from a stored database, manual inputs, or a distributive network based on matching of plans/programs with at least one of the sensor outputs or situational awareness data is provided. Apparatus and methods are also provided that enable an exemplary system to obtain data associated with an area surrounding the vehicle and provide this data to other system, subsystems, and personnel.

17 Claims, 8 Drawing Sheets

(56) References Cited

U.S. PATENT DOCUMENTS

| | | | | |
|---|---|---|---|---|
| 7,272,474 | B1* | 9/2007 | Stentz | G01C 7/04 701/26 |
| 8,346,391 | B1* | 1/2013 | Anhalt | B25J 9/163 700/248 |
| 8,485,037 | B1 | 7/2013 | Takacs et al. | |
| 9,056,676 | B1* | 6/2015 | Wang | B64F 1/00 |
| 10,165,722 | B2* | 1/2019 | Ackerman | A01B 69/008 |
| 2008/0121097 | A1* | 5/2008 | Rudakevych | F41A 19/58 89/28.05 |
| 2009/0276110 | A1* | 11/2009 | Martinez | G01S 17/026 701/23 |
| 2009/0326735 | A1* | 12/2009 | Wood | G05D 1/0027 701/2 |
| 2010/0030417 | A1* | 2/2010 | Fang | G05D 1/0274 701/25 |
| 2010/0318242 | A1* | 12/2010 | Jacobsen | F41H 13/00 701/2 |
| 2011/0118927 | A1* | 5/2011 | Cima | G05D 1/0088 701/26 |
| 2011/0184604 | A1* | 7/2011 | Franke | G05D 1/0088 701/23 |
| 2012/0095619 | A1* | 4/2012 | Pack | G05D 1/0038 701/2 |
| 2012/0185115 | A1* | 7/2012 | Dean | F41H 7/005 701/2 |
| 2013/0342700 | A1 | 12/2013 | Kass | |
| 2014/0062754 | A1* | 3/2014 | Mohamadi | F41H 11/136 342/22 |
| 2014/0172357 | A1* | 6/2014 | Heinonen | G01C 21/005 702/150 |
| 2016/0117932 | A1* | 4/2016 | Park | G01S 19/39 701/3 |
| 2016/0157414 | A1* | 6/2016 | Ackerman | A01B 69/008 701/25 |
| 2016/0378109 | A1* | 12/2016 | Raffa | G05D 1/0038 701/2 |
| 2017/0255824 | A1* | 9/2017 | Miller | G06K 9/00624 |
| 2017/0330466 | A1* | 11/2017 | Demetriades | G08G 5/0034 |
| 2017/0374323 | A1* | 12/2017 | Gornik | G06T 7/0004 |
| 2018/0004207 | A1* | 1/2018 | Michini | G05D 1/0094 |
| 2018/0292223 | A1* | 10/2018 | Leach | G05D 1/0094 |

OTHER PUBLICATIONS http://www.cse.usf.edu/~r1k/MachineVisionBook/MachineVision.files/MachineVision_Chapter15.pdf; pp. 459-491; 33 pages.

http://www.metrology.pg.gda.pl/full/2012/M&MS_2012_003.pdf; Metrology and Measurement Systems—Sensors and Systems for the Detection of Explosive Devices—An Overview; by Zbigniew Bielecki et al; 26 pages.

Detection Improvised Explosive Device (IED) Emplacement Using Infrared Image by Kamarul Hawari Ghazali and Moh Shawal Jadin; 2014 UKSim_AMSS 16th International Conference on Computer Modelling and Simulation; 4 pages.

* cited by examiner

STEP 101: MANEUVERING AND MOVING AN UNMANNED MOBILE SCOUT VEHICLE ALONG A PREDETERMINED ROUTE OF TRAVEL, AND MAINTAINING A PREDETERMINED DISTANCE AHEAD OF A MOBILE CONTROL VEHICLE, WHEREIN SAID PREDETERMINED DISTANCE CAN INCLUDE A MINIMUM DISTANCE REQUIRED FOR SAID MOBILE CONTROL VEHICLE TO DEFEAT OR AVOID A SENSOR DETECTABLE PATTERN OR CONDITION OF INTEREST (E.G., A ROAD SIDE BOMB WITH A CELL PHONE TRIGGER, A DESTRUCTIVE TRAFFIC/ROAD/ELECTROMAGNETIC ENVIRONMENT AUTOPILOT DISRUPTIVE CONDITIONS THAT COULD INTERFERE WITH AUTOPILOT FUNCTIONS) DETECTED BY A PLURALITY OF SENSORS AFFIXED TO SAID UNMANNED MOBILE SCOUT VEHICLE PRIOR TO SAID MOBILE CONTROL VEHICLE ENTERING AN EFFECTIVE RANGE (E.G., A BLAST RADIUS, AN ELECTROMAGNETIC INTERFERENCE) OF SAID CONDITION OF INTEREST

STEP 103: OPERATING SAID PLURALITY OF SENSORS COUPLED WITH A FIRST CONTROL SYSTEM (E.G., A PROCESSOR AND A STORAGE MEDIUM) ONBOARD SAID UNMANNED MOBILE SCOUT VEHICLE TO COLLECT A PLURALITY OF SENSOR OUTPUT ON OR NEAR (E.G., IN FRONT OF OR ABOVE SAID MOBILE CONTROL VEHICLE) SAID PREDETERMINED ROUTE OF TRAVEL TO BE ANALYZED BY SAID FIRST CONTROL SYSTEM

STEP 105: ANALYZING AND MATCHING THE PLURALITY OF SENSOR OUTPUT (E.G., ELECTROMAGNETIC SPECTRUM PATTERNS/IMAGE PATTERNS/THERMAL PATTERNS) WITH ONE OR MORE STORED CONDITION OF INTEREST DATA PROFILES ON A FIRST STORAGE MEDIUM COUPLED WITH A FIRST PROCESSOR

STEP 107: TRANSMITTING A WARNING SIGNAL USING A TRANSMITTER ON SAID UNMANNED MOBILE SCOUT VEHICLE TO A RECEIVER ON SAID MOBILE CONTROL VEHICLE BASED UPON MATCHING OF AT LEAST ONE SAID PLURALITY OF SENSOR OUTPUT WITH ONE OR MORE SAID STORED CONDITION OF INTEREST PROFILES ON SAID FIRST STORAGE MEDIUM, WHEREIN SAID WARNING SIGNAL INCLUDES A PLURALITY OF FIRST ELEMENTS (E.G., A WARNING IDENTIFIER CODE, ELECTROMAGNETIC PATTERNS, OPTICAL IMAGE PATTERNS, THERMAL IMAGE PATTERNS)

STEP 109: SELECTIVELY, TRANSMITTING SAID WARNING SIGNAL AND/OR SAID PLURALITY OF SENSOR OUTPUT USING SAID TRANSMITTER ON SAID UNMANNED MOBILE SCOUT VEHICLE OR A TRANSMITTER ON SAID MOBILE CONTROL VEHICLE TO A CLOUD NETWORK FOR FURTHER ANALYSIS BY A REMOTE SOURCE (E.G., A PALANTIR DATA ANALYSIS REMOTE NETWORK)

STEP 111: SELECTING A MATCHING PROTECTIVE RESPONSE ACTION OR ACTIVITY (E.G., AN ELECTROMAGNETIC JAMMER PROFILE SUITABLE TO JAM A SIGNAL IN A ZONE OF INTEREST, ALTER AUTOPILOT/DISENGAGE VEHICLE AUTOPILOT, PROJECT A HAZARD WARNING/AVOIDANCE WARNING) FROM A LIBRARY OF A PLURALITY OF PROTECTION RESPONSE ACTIONS OR ACTIVITIES STORED ON A SECOND STORAGE MEDIUM MOUNTED ON SAID MOBILE CONTROL VEHICLE COUPLED WITH A SECOND PROCESSOR BASED UPON MATCHING ONE OR MORE OF SAID PLURALITY OF FIRST ELEMENTS IN A WARNING SIGNAL WITH ONE OR MORE OF A PLURALITY OF SECOND ELEMENTS (E.G., A WARNING IDENTIFIER CODE, ELECTROMAGNETIC PATTERNS, OPTICAL IMAGE PATTERNS, THERMAL IMAGE PATTERNS) OF SAID LIBRARY OF PROTECTION RESPONSE ACTIONS OR ACTIVITIES

FIG. 7

STEP 113: OPTIONAL, DETERMINING TO AVOID OR CONTINUE ON SAID PREDETERMINED ROUTE OF TRAVEL BASED UPON A MATCH OR NO MATCH OF SAID PROTECTIVE RESPONSE ACTION OR ACTIVITY WITH SAID WARNING SIGNAL, WHEREIN AN ALTERED ROUTE OF TRAVEL WILL BE DETERMINED TO ENTIRELY AVOID SAID EFFECTIVE RANGE OF SAID CONDITION OF INTEREST WHEN NO MATCHING PROTECTIVE RESPONSE ACTION OR ACTIVITY IS SELECTED

STEP 115: TRANSMITTING SAID PLURALITY OF SENSOR OUTPUT, SAID WARNING SIGNAL, AND SAID PROTECTIVE RESPONSE ACTION OR ACTIVITY TO A DISPLAY SHOWING A GRAPHICAL USER INTERFACE, WHEREIN SAID GRAPHICAL USER INTERFACE DISPLAYS A VISUAL REPRESENTATION OF SAID PLURALITY OR SENSOR OUTPUT AND SAID MATCHING PROTECTIVE RESPONSE ACTION OR ACTIVITY TO AN OPERATOR ONBOARD SAID MOBILE CONTROL VEHICLE, AND PERMIT SAID OPERATOR TO INPUT A PLURALITY OF CONTROL ACTIONS (E.G., MANUALLY ALTER OR MODIFY THE OPERATION OF A RECONFIGURABLE RESPONSE SYSTEM, GENERATE SAID ALTERED ROUTE OF TRAVEL)

STEP 117: TRANSMITTING SAID MATCHING PROTECTIVE RESPONSE ACTION OR ACTIVITY DATA TO A RECONFIGURABLE RESPONSE SYSTEM (E.G. AUTOPILOT, ELECTROMAGNETIC FREQUENCY JAMMER) AFFIXED TO SAID MOBILE CONTROL VEHICLE, WHEREIN SAID MATCHING PROTECTIVE RESPONSE ACTION OR ACTIVITY DATA INCLUDES A PLURALITY OF MACHINE READABLE RECONFIGURING INSTRUCTIONS OR SIGNALS CONFIGURED TO PROGRAM AND/OR OPERATE RECONFIGURABLE RESPONSE SYSTEM TO DEFEAT OR AVOID A DETECTED CONDITION OF INTEREST

STEP 119: ALTERING OR MODIFYING AN OPERATION OR FUNCTION OF SAID RECONFIGURABLE RESPONSE SYSTEM TO RESPOND BASED A PLURALITY OF MACHINE READABLE RECONFIGURING INSTRUCTIONS OR SIGNALS THAT DEFEAT OR DESTROY SAID DETECTED CONDITION OF INTEREST TO BE ENCOUNTERED BY SAID MOBILE CONTROL VEHICLE BASED UPON SAID PROTECTIVE RESPONSE ACTION OR ACTIVITY

FIG. 8

REMOTE INFORMATION COLLECTION, SITUATIONAL AWARENESS, AND ADAPTIVE RESPONSE SYSTEM FOR IMPROVING ADVANCE THREAT AWARENESS AND HAZARDOUS RISK AVOIDANCE

CROSS-REFERENCE TO RELATED APPLICATIONS

The present application claims priority to U.S. Provisional Patent Application Ser. No. 62/369,364, filed Aug. 1, 2016, entitled "REMOTE INFORMATION COLLECTION, SITUATIONAL AWARENESS, AND ADAPTIVE RESPONSE SYSTEM (RICSAARS) AND RELATED METHODS," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,369) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present disclosure relates to a situational awareness, adaptive automation, and decision support system used in various environments with respect to mobile systems, platforms, or entities along paths of travel. Embodiments of this disclosure include systems that facilitate improved automated and manual responses and interaction with an environment such as a vehicle in a high threat area, or a self-driving vehicle or system with program onboard vehicle equipment to respond based on sensor data received from a reconnaissance vehicle and/or data cloud related to conditions of interest along a path of travel of a vehicle or self-driving vehicle (e.g., damage to a road that impedes self-driving vehicle from operating its autopilot system, traffic conditions, radio controlled equipment that can interfere with the vehicle, etc.). Embodiments can also detect a combination of detectable conditions or entities along a path of travel by a mobile platform or entity such as a mobile inspector using an autonomous or remotely piloted system to inspect a chemical plant for personnel who are carrying unauthorized cell phones through areas that have sensitivity to electromagnetic radiation hazards such as compounds or structures that can conduct an RF signal to trigger an explosion or fire as well as systems vulnerable to electromagnetic interference (EMI). Embodiments of the invention can also assist with warning an entity or platform as it moves through an area with radio frequency related hazards by identifying structures that will or can react hazardously to the mobile platform or entity so that the mobile entity or platform can reroute or address the detected hazard combination.

Improvised explosive devices (IED) are an ever increasing threat in modern society. These types of hazardous systems are generally positioned along a likely path of travel, and activated by a remote signal when a desired target is within range of the hazardous system. An undesirable system to counter these types of weapon systems could be electronic signal jamming devices that are loaded with a static loadset prior to an operation. A loadset includes data or machine readable programming which controls the onboard equipment such as the signal jamming device or other equipment items such as an on board autopilot system. Such an undesirable system would be unable to modify or adjust the static loadset during a mission based on actual specific threats encountered while on a mission, and no information would be provided to operating personnel regarding any threats that the jammer is unable to defeat. Other systems, such as self-driving vehicles, also have shown an inability to adapt to actual environments or changing conditions which need improvements as well.

Generally, apparatus and methods are provided including an adaptive decision support and control system to obtain data associated with the environment of operation and provide the data to other systems, subsystems, and personnel. Various embodiments of the disclosure can include a system adapted to improve the safety or efficiency of systems during the operation of ground operated vehicles. Various embodiments of the invention are provided that can include an adaptive situational awareness, decision support, and automated response system operable to receive sensor data or situational awareness data for a region of interest along or in advance of a path of travel of a vehicle. Such embodiments can be configured to obtain the sensor data or situational awareness data from at least a mobile reconnaissance sensor platform. Various exemplary embodiments can include control systems such as a processor and machine readable instructions that select/execute one or more response programming or plans to operate the vehicle or one or more vehicle equipment items from a stored database or a distributive network based on matching a plans program with at least one of the sensor outputs or situational awareness data to avoid or mitigate a threat associated with the sensor output or situational awareness data.

Embodiments of the present disclosure can include an unmanned mobile reconnaissance vehicle (UMRV) (e.g., an unmanned aerial vehicle) maintaining a flight path ahead of a mobile control vehicle (MCV) searching and analyzing the frequencies of devices in the path of the MCV to locate RF emitting conditions of interest and relay this information to the MCV. This information could be used to adapt installed hardware/software, e.g., radio frequency jamming or hacking systems, to defeat a threat, or alter a mission path of travel or activity to avoid the threat.

Another embodiment of the disclosure can address one major obstacle encountered in evolution towards widespread self-driving vehicles (SDV): competition and management of a radio frequency spectrum required for these vehicles to communicate with other vehicles and their surroundings. The number of radio frequencies used to facilitate the operation of autonomous vehicles will only increase as the number of SDVs continues to rise, and there are only a finite number of frequencies available for use. This embodiment of the disclosure would allow for an UMRV to maintain a path ahead of a SDV to assess frequencies currently being used by other vehicles in order to deconflict a plurality of frequencies to avoid jamming or interference of either system's signals. Additionally, sensors on the UMRV would provide the occupants of the SDV with supplementary information regarding traffic conditions, road conditions or road hazards.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 7 shows exemplary method for operating the exemplary embodiment of RICSAARS;

FIG. 8 shows a continuation of the FIG. 7 exemplary method for operating the exemplary embodiment of the RICSAARS.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
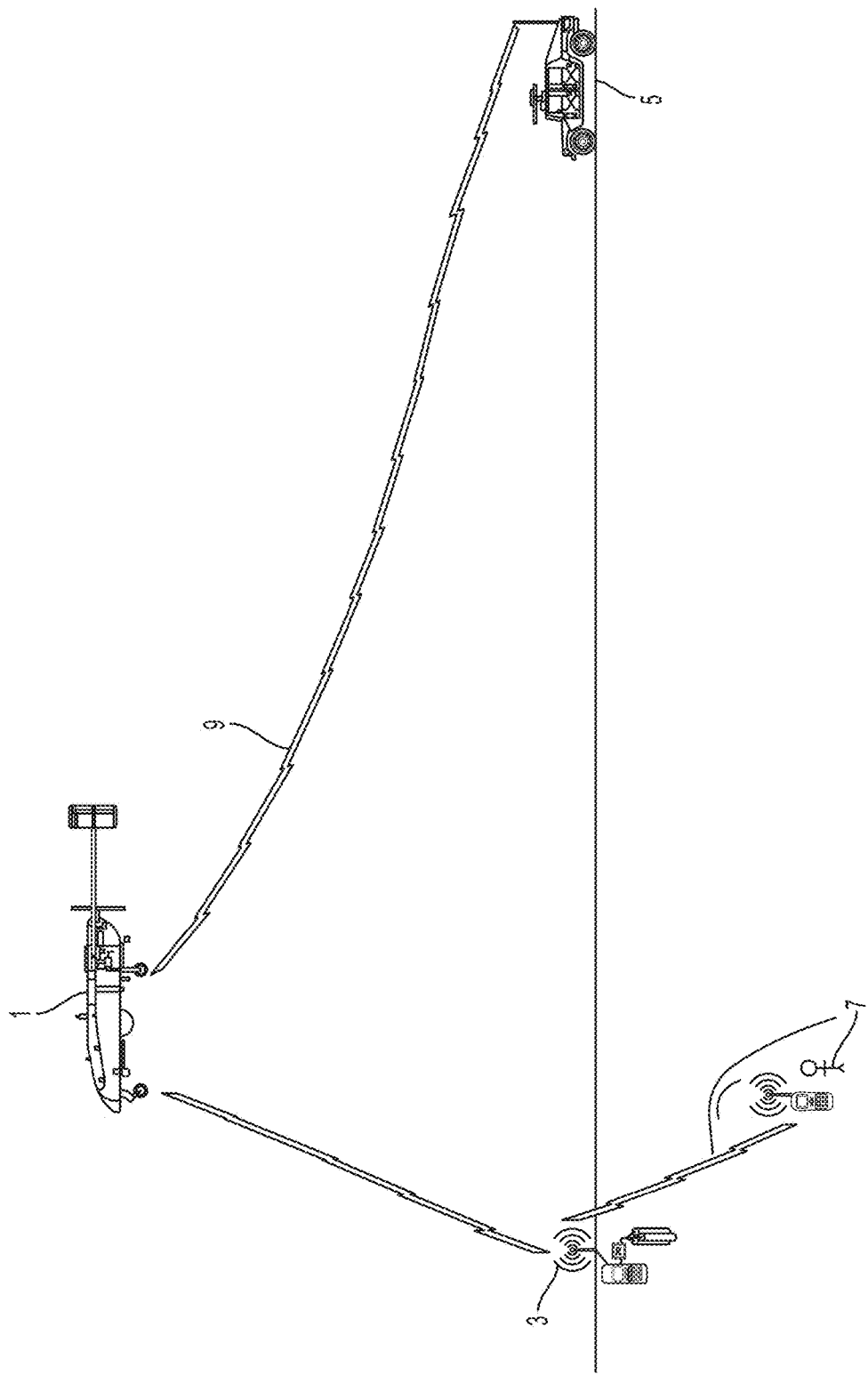
FIG. 1 shows an embodiment of the invention used to detect signals from a remote controlled system or condition of interest such as an RF signal controlled detonating source.

Referring initially to FIG. 1, an unmanned mobile reconnaissance vehicle (UMRV) 1 (e.g., an unmanned aerial vehicle (UAV)) with an onboard computer/software module (not shown) configured to obtain, process and provide a plurality of information to a ground vehicle (GV) 5 via a communication link 9. The UMRV 1 further comprised of a plurality of sensors (not shown). The UMRV 1 can be configured to maintain a flight path ahead of a mobile control vehicle (MCV) 5 while the onboard computer/software module is configured to detect a condition of interest or threat 3, or signals from a remote detonating source 7 intended to activate potential threats. In one embodiment a condition of interest or threat includes a location of condition of interest or threat, signal used to activate the threat (e.g., a radio frequency transmitter/receiver (e.g., a cell phone or walkie-talkie), a hazardous road condition, traffic, etc.). The type of threat, location of threat, and signal used to activate the threat is then communicated to the MCV 5 via the communication link 9 so that onboard systems or the occupants of the vehicle can adapt various systems to defeat or respond to the threat or condition of interest, or choose to avoid the threat entirely (e.g., develop an alternate route of travel).

Figure 2:
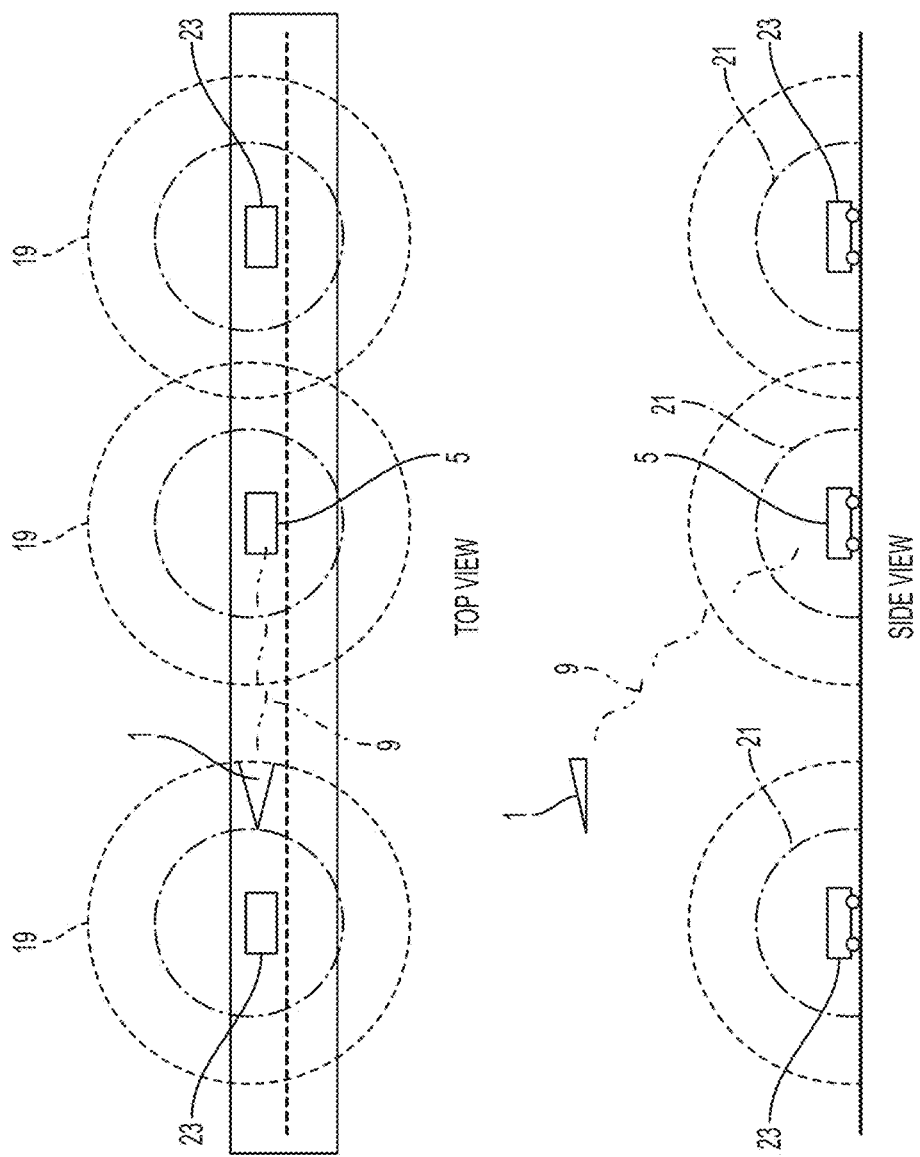
FIG. 2 shows another embodiment of the invention used to detect signals from other self-driving vehicles.

Referring to FIG. 2, another embodiment of a Remote Information Collection, Situational Awareness, and Adaptive Response System (RICSAARS) comprising of an UMRV 1 that is coupled with a MCV 5 via a communication link 9, wherein the MCV 5 is configured to be self-driven. The communication link 9 comprising of a UMRV mounted transceiver (not shown) and a MCV mounted transceiver (not shown). The UMRV 1 is equipped with an electromagnetic spectrum scanning device (not shown; e.g., radio frequency scanner, electro-optic for light signals including laser generated, infrared etc.) that is capable of identifying signals 19, 21 by other self-driving vehicles (SDVs) 23 within the path of the travel of the MCV 5. The electromagnetic spectrum scanning device will determine signal strengths and range of the plurality of signals 19, 21. A signal data collected by the electromagnetic spectrum scanning device is compiled by an UMRV control system (e.g., a first processor and a first storage medium not shown) and then relayed to the MCV 5 via the communication link 9. A UMRV control system (not shown) will analyze the signal data, including frequency data, to determine if one or more of the signals, frequencies, etc. detected by the system along a path of travel will interfere with one or more of the signals 19, 21 by the MCV 5. The MCV control system (e.g., a second processor and a second storage medium not shown) will then determine the need to alter one or more of the signals-in-use by the MCV 5 so as to avoid electromagnetic interference and the subsequent reduction in functionality of the autonomous operation of the vehicle in various paths of travel areas. The UMRV 1 can also be equipped with an optical camera system (not shown) and a thermal imaging sensing device (not shown) which are both configured to capture a plurality of images of the traffic and road conditions along the route of travel of the MCV 5. The plurality of images is compiled by the UMRV control system and then relayed to the MCV control system via the communication link 9. A graphic user interface (GUI) (not shown) will display the plurality of images captured by the optical camera system (not shown) so that the onboard system or the occupants of the MCV 5 can visually assess the road and traffic conditions along the route of travel and make an appropriate response based on the condition of interest. In some embodiments, the GUI can display the current route of travel and any changes to the route of travel based on conditions of interest.

Figure 3:
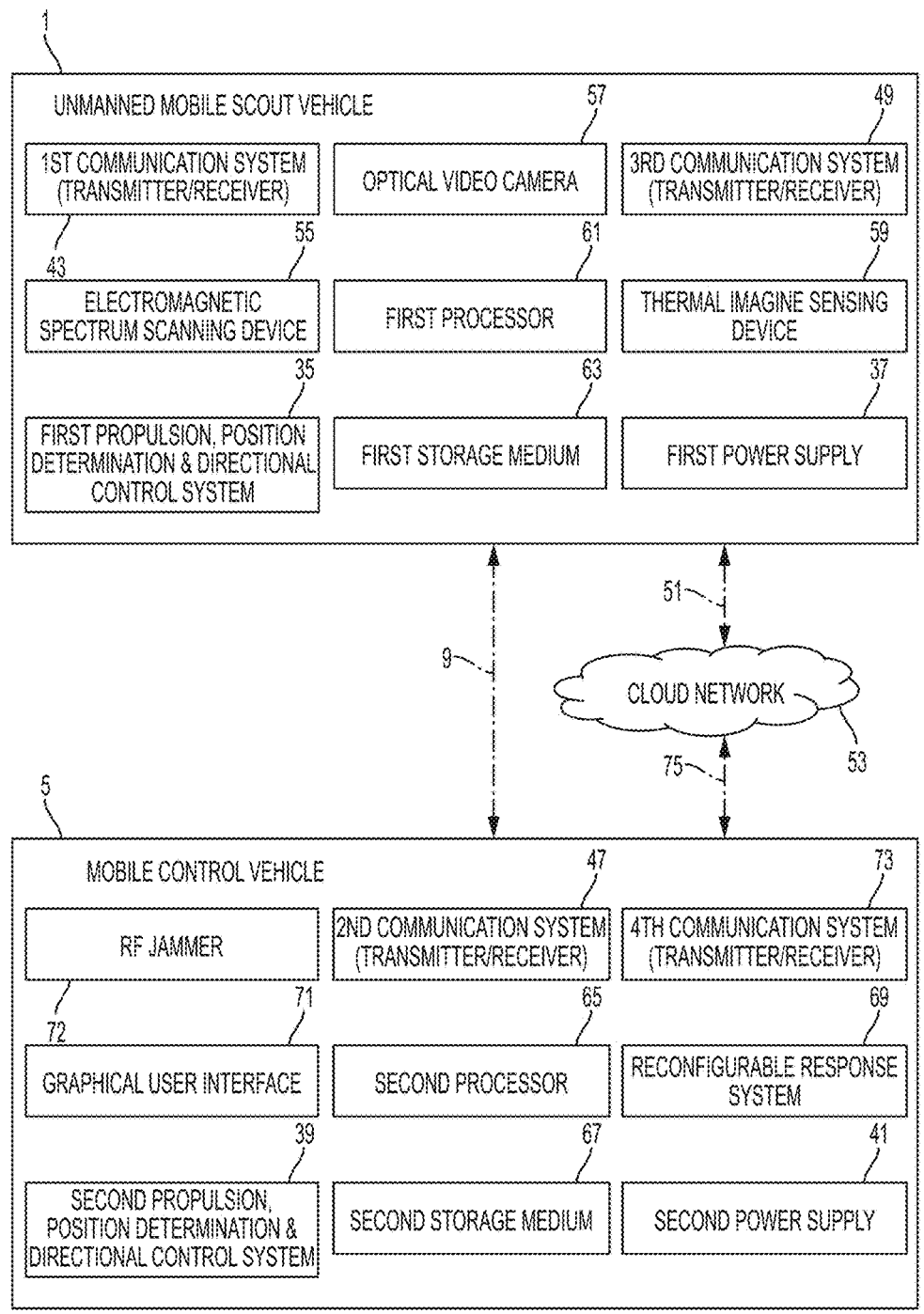
FIG. 3 shows an exemplary component structure of an exemplary Remote Information Collection, Situational Awareness, and Adaptive Response System (RICSAARS)

Referring to FIG. 3, an exemplary component structure of the RICSAARS, an UMRV 1 is configured to move and maneuver along a predetermined route of travel (e.g., input by a user or driver before or during travel and communicated to the UMRV 1 for flight path determination by onboard systems or determined by the UMRV 1 via visual pattern matching of the MCV 5, automated tracking of the MCV 5, and predictive route estimating along a route the MCV 5 is actually traveling on) and maintain a predetermined distance in front of a MCV 5 using a first propulsion, position determination, and directional control system (PPDDCS) 35, and a first power supply 37 (e.g., a battery, an engine with alternator, solar power, fuel cell, etc.) provides power to operate a plurality of various embodiments of UMRV systems and components. In exemplary embodiments, the first PPDDCS 35 relays position determination outputs to the MCV 5. The MCV 5 travels along the predetermined route of travel by a second propulsion, position determination (e.g., global position system (GPS), inertial navigation unit, etc.), and directional control system (PPDDCS) 39. In exemplary embodiments, the second PPDDCS 39 relays position determination outputs to the UMRV 1. A second power supply 41 provides power to operate various MCV systems and components. A first communication system 43 mounted to the UMRV 1 can be configured to establish a first communication link 9 to transmit and receive data to and from a second communication system 47 mounted to the MCV 5. A third communication system 49 mounted to the UMRV 1 is configured to establish a second communication link 51 to send and receive situational awareness data related to the route of travel to and from a cloud network 53 (e.g., threats to the MCV 5, traffic conditions, road damage, etc. to include categories of threats or identified risks or conditions as well as location data). UMRV 1 further includes a sensor system 55, 57, 59 that can be configured to generate a plurality of sensor outputs associated with the predetermined route of travel, where the sensor system 55, 57, 59 can include an electromagnetic spectrum scanning device 55 configured to collect a plurality of electromagnetic signals from an area of interest on or near the route of travel in advance of the MCV 5 as it travels, an optical video camera 57 configured to capture a plurality of images in the area of interest, and a thermal imaging sensing device 59 configured to capture a plurality of thermal images of the area of interest. The sensor system 55, 57, 59 is coupled with the first analysis/control system (e.g., a first processor 61 and a first storage medium 63) that receives and analyzes the plurality of sensor outputs to match with one of a plurality of stored condition of interest data profiles stored on a first storage medium 63 and outputs a detected condition of interest data profile associated with a matched condition of interest profile. Conditions of interests can include threats to the MCV 5 such as detected RF signals from an IED, road conditions that are potentially hazardous to the MCV 5, traffic, etc., which would require a potential change of path or operation or programming of equipment on the MCV 5 using onboard or cloud supplied system reprogramming or processing alterations. The UMRV 1 can be further configured to mark (e.g., drop an aerial flare over the top of the condition of interest, illuminate it with a spotlight, or pin-point it with a visible or infrared laser beam) the location of the condition of interest to enable personnel on the MCV 5 to easily respond to the detected conditions. The cloud network 53 is further configured to relay the situational awareness data to other MCVs which are not directly associated with the UMRV 1 but may be affected by the conditions of interest detected by the sensor system 55, 57, 59. Additionally, the cloud network 53 can notify an appropriate authority (e.g., Explosive Ordnance Disposal (EOD), Quick Reaction Force (QRF), Highway Patrol, or Department of Transportation) of an environmental condition encountered by the UMRV 1. The first control system 61, 63 controls the first communication system 43 to transmit a warning signal associated with a detected condition of interest data profile across the first communication link 9 to the second communication system 47 based upon the detected condition of interest, wherein the warning signal includes identifier data and sensor data associated to a detected condition of interest. A second control system 65, 67 (e.g., a second processor 65 and a second storage medium 67) receives the warning signal from the second communication system 47 and selects a matching protective response action or activity from a library of protective response actions or activities stored on a second storage medium 67 coupled with the second processor 65. Protective responses can include executing reprogramming systems that takes or accesses programs that are onboard in a library or requested/supplied from a remote source (e.g., cloud computing source) that matches identifiers or attributes of the warning signal data or supplied from a cloud or remote source with the programs that are used to reprogram onboard systems to mitigate or eliminate risks associated with the identified warning. The second control system 65, 67 transmit the matching protective response action or activity data to a system onboard the MCV 5 (e.g., a reconfigurable response system 69). The reconfigurable response system 69 can be configured to alter or modify its operation in response to signals or machine readable instructions contained in matching protective response action or activity data to defeat or avoid a detected condition of interest associated with the sensor output. Additionally, an exemplary embodiment can include a RF jammer 72 (e.g. a Counter Radio-Controlled Improvised Explosive Device Electronic Warfare (CREW) jammer) with a loadset which includes a set of machine readable instructions for jamming a defined set of radio frequencies. The reconfigurable response system can be configured to send updated loadsets to a RF jammer 72 in response to detected conditions of interest to alter which radio frequencies are being jammed by the RF jammer 72. The second control system 65,67 can be configured to generate one or more GUI 71 on a display on the MCV 5 showing at least some of the plurality of sensor outputs and one or more of a plurality of visualization elements (e.g., a condition of interest identifying symbol, a compass, a status of the reconfigurable response system, etc.). The graphical user interface 71 is further configured to enable an operator to input a plurality of control actions that alter or modify the operation of the UMRV 1, the sensor system 55, 57, 59, and the reconfigurable response systems 69. The second control system 65,67 is further coupled with a fourth communication system 73 to establish a third communication link 75 to transmit and receive data (e.g., sensor data from other platforms, threat information related to the route of travel, response instructions or programs, conditions of interest response plans/programs/machine readable instructions) to and from the cloud network 53. Data received from the cloud network 53 can be used to control onboard systems, alert personnel onboard the MCV 5, or provide additional machine readable instructions to respond to threats or detected conditions of interest. In some embodiments, the first, second, third, and fourth communications systems can communicate using RF signals, laser optics, or both. Both UMRV 1 and MCV 5 are configured to share position information using a secure communication format (e.g., encrypted, burst transmission, etc.) so that UMRV 1 maintains a designated or predetermined distance in front of the MCV 5 along the MCV's route of travel using their onboard position determination system 35, 39. In situations where the communications systems are operating in unreliable environments (e.g., environments with high background RF interference), the UMRV 1 and MCV 5 can automatically cycle through a range of radio frequencies to locate an available communication frequency or manually cycle through frequencies at the discretion of an operator in the MCV or off-site location (e.g., command station connected through the cloud). The UMRV 1 can also be configured to have an optical system such as an infrared laser rangefinder and an optical tracking system that tracks the MCV 5 using pattern recognition to maintain the designated or predetermined distance. In some embodiments, optical systems on the UMRV 1 and MCV 5 can also transmit other information (e.g., gathered data, modified data, control information, etc.) between each other using optical communication lasers. Optical systems can be particularly effective in scenarios with high RF interference (e.g., crowded cell or telecommunication networks, radio jammer interference, consumer device interference) by allowing transfer of information by line of sight. In situations where loss of communications occurs, the UMRV 1 can switch between RF and optical communications to attempt to re-establish communications with the MCV 5.

Figure 4:
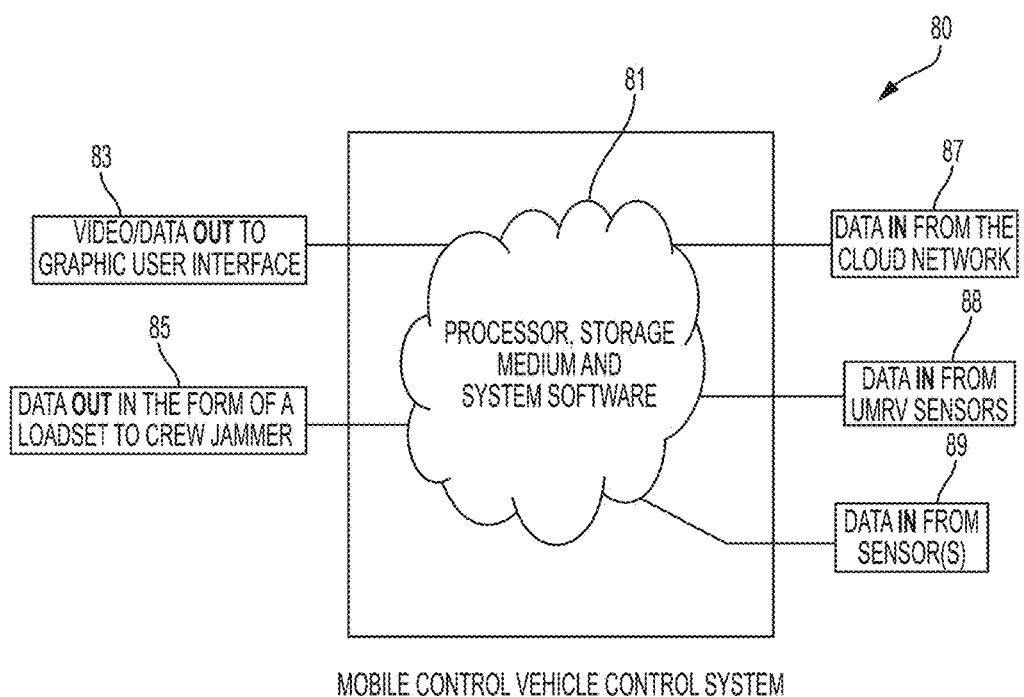
FIG. 4 shows an exemplary simplified communication structure of the RICSAARS.

Referring to FIG. 4, an exemplary simplified communication structure of a MCV control system 80 configured to receive data input from a plurality of sources, process the data by a processor, storage medium and system software 81, and transmit data outputs to a plurality of sources. The plurality of sources that transmit data to the MCV Control system 80 includes a cloud network, UMRV 1, and a plurality of MCV onboard sensors (e.g., video, RF, thermal, night vision, etc. used to detect detectable characteristics of one or more fields of view of one or more areas around the MCV). The exemplary data from a cloud network 87 can be configured to transmit sensor, environmental, and MCV reconfiguration data from an external source. Multiple UMRVs 1 can contribute information to the cloud network to locate and record conditions of interest over a wider area. The data from UMRV sensors 88 can be configured to transmit electromagnetic, video, and thermal imaging signals, captured by systems and sensors mounted on the UMRV to the MCV control system 80. The data from a plurality of MCV onboard sensors 89 can be configured to transmit electromagnetic, video, and thermal imaging signals, captured by systems and sensors mounted on the MCV to the MCV Control system 80. A graphical user interface 83 configured to receive a video signal to display a plurality of images and visualization elements related to the data inputs received from the plurality of sources and processed by the processor, storage medium and system software 81. A reconfigurable control system 85 adapted to interact with external communication systems (e.g., override, take control, etc.) is also provided (e.g., system adapted to override cell phone tower influence for a mobile cell system in closer proximity to the MCV a CREW Jammer) that includes a programmable transmitter and an antenna configured to receive data (such as a loadset including frequencies, transmission protocols for jamming or controlling a particular communication or control system, etc.) from the processor (or another system), storage medium and system software 81 which is capable of altering operation of the reconfigurable control system 85. Such altering of operation of the reconfigurable control system 85 can include altering operation of the reconfigurable control system 85 to influence, jam, or potentially even take control of a target system or system that is an element in a combination of elements (e.g. radio frequency controlled IED, unauthorized cell phone in a hazardous environment such as radio frequency sensitive materials or systems, a hazard to autonomous vehicle navigation such as malfunctioning system or a condition (e.g., unexpected terrain or congested RF spectrum) which is confusing the autonomous system's ability to navigate safely, etc.).

Figure 5:
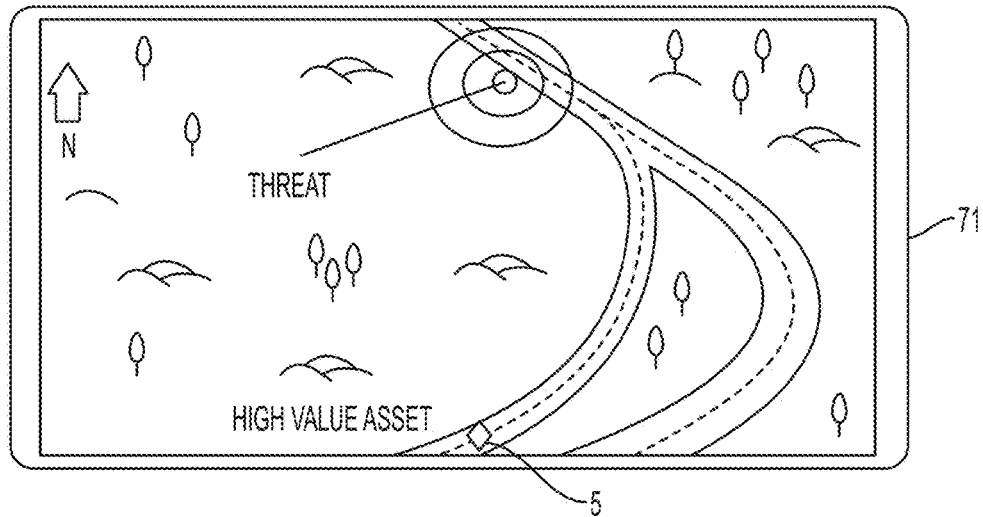
FIG. 5 shows an exemplary graphic user interface associated with the RICSAARS.

Referring to FIG. 5, an exemplary graphical user interface 71 configured to display key information to personnel associated with the RICSAARS. The image depicted in FIG. 5 shows an alternative embodiment of the invention where a high value asset (e.g., the MCV 5) can be seen in the field of view because an unmanned mobile scout vehicle (e.g., UMRV 1) is behind the MCV 5 at a significant altitude above the surface of the predetermined route of travel. This shows how the unmanned mobile scout vehicle (e.g., UMRV 1) can be in a location other than ahead of the high value asset but still maintaining over watch and visibility on an area of a route the high value asset is traversing. The exemplary unmanned mobile scout vehicle (e.g., UMRV 1) can in many cases maintain a predetermined distance in front of and along the predetermined route of travel of the high value asset (e.g., MCV 5) so that the unmanned mobile scout vehicle's (e.g., UMRV 1) sensor system detects a condition of interest (e.g., risk to the MCV 5 on or along its path of travel or route) prior to the MCV 5 entering an effective range of such a condition of interest (e.g., a blast radius, road condition that interferes with self-driving systems such as an autopilot, an electromagnetic interference range, etc.). However, the UMRV's 1 proximity and location relative to the MCV 5 can, based on circumstances (e.g., high tension power lines, obstructions to flight, weather, other aerial vehicles, quiet zones, sound that might cause unwanted detection of the UMRV 1, etc.), be altered to provide a best vantage point from where the sensor system can sufficiently capture the conditions of interest to be encountered by MCV 5. Additionally, the UMRV 1 is configured to operate at a high altitude above the MCV 5 in order to avoid detection so that it does not alert personnel associated with the condition of interest. Exemplary embodiments include an interactive geospatial map in the display image which allows the conditions of interest 3 (e.g. FIG. 6) to be added to a premade map. Personnel onboard the MCV 5 can use the graphical user interface 71 to group or sort information gathered by the UMRV 1. Information gathered by other sources (e.g., human observations, satellite imagery) can also be added to the map. In some embodiments, a UMRV 1 can be programmed to automatically avoid or maneuver towards particular conditions of interest 3 (e.g., move away from fire hazards) or may be manually commanded to do so by the MCV 5 or cloud network 53.

Figure 6:
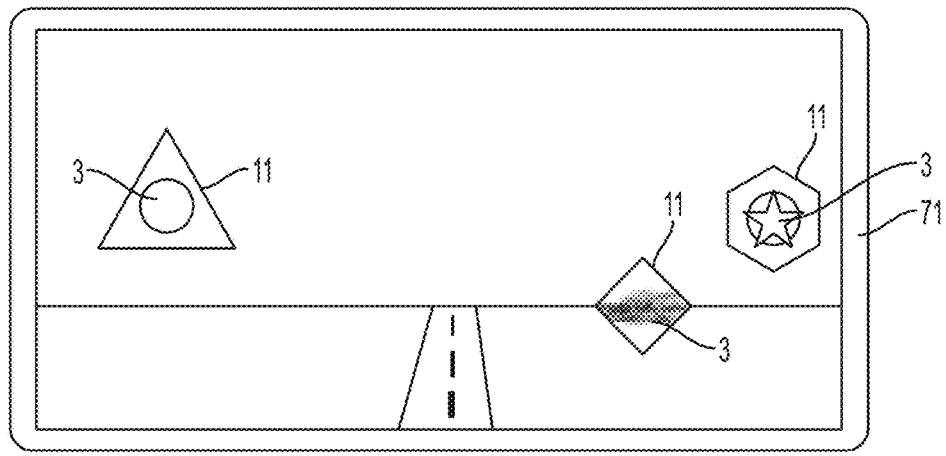
FIG. 6 shows another exemplary graphic user interface associated with an embodiment of the RICSAARS.

Referring to FIG. 6, an exemplary graphical user interface 71 with a display view configured to display identified conditions of interest 3 superimposed on an environment display image. A condition of interest can be marked with condition of interest indicators 11 based on the type of condition identified (e.g., RF transmitter, fire hazard, collision threat) or certainty of threat/hazard (e.g., matching RF pattern of a known threat, matching appearance of a known threat). The environment display image can be a prerecorded image of the area or can be an image recorded by a UMRV 1 at the time the condition of interest 3 was detected. FIG. 6 shows a display view of a UMRV 1 looking at an angle approximately parallel to the horizon, but other embodiments can use one or more other angles. Exemplary embodiments allow a UMRV 1 to identify differences between current and previously known conditions in the environment. Some embodiments can use systems designed to detect objects along a route of travel (e.g. U.S. Pat. Nos. 5,757,287 and 5,554,983 A incorporated by reference). Additional embodiments can use systems designed to detect objects hidden on or underground (e.g. U.S. Pat. No. 8,485,037 B1 incorporated by reference). Some embodiments can further incorporate omnidirectional VR difference ID systems which allow a VR operator to shift his physical view (e.g., turning his head) to freely adjust the display view to shift the scope of the environment display image (e.g., viewing a different angle surrounding the UMRV). These and similar embodiments allow an operator to survey the environment around the UMRV 1 while the displayed view provides updated condition of interest indicators 11 and difference information.

Referring to FIG. 7, an exemplary method for operating an exemplary embodiment of a RICSAARS. At step 101, maneuvering and moving the UMRV 1 along a predetermined route of travel, and maintaining a predetermined distance ahead of the MCV 5, wherein the predetermined distance can include a minimum distance required for the MCV 5 to defeat or avoid a sensor detectable pattern or a condition of interest (e.g., a road side bomb with a cell phone trigger, a destructive traffic/road/electromagnetic environment autopilot disruptive conditions that could interfere with autopilot functions) detected by a plurality of sensors affixed to the UMRV 1 prior to the MCV 5 entering an effective range (e.g., a blast radius, an electromagnetic interference) of the condition of interest. At step 103, operating the plurality of sensors coupled with a first control system (e.g., a processor and a storage medium) onboard the UMRV 1 to collect a plurality of sensor output on or near (e.g., in front of or above the MCV 5) the predetermined route of travel to be analyzed by the first control system. At step 105, analyzing and matching the plurality of sensor output (e.g., electromagnetic spectrum patterns/visual patterns/thermal patterns) with one or more stored condition of interest data profiles on a first storage medium coupled with a first processor. At step 107, transmitting a warning signal using a transmitter on the UMRV 1 to a receiver on the MCV 5 based upon matching of at least one of the plurality of sensor output with one or more the stored condition of interest profiles, wherein the warning signal includes a first elements (e.g., a warning identifier code, electromagnetic patterns, optical image patterns, thermal image patterns). At step 109, selectively, transmitting the warning signal and/or the plurality of sensor output using said transmitter on the UMRV 1 or a transmitter on the MCV 5 to a cloud network 53 for further analysis by a remote source (e.g., a data analysis remote network). At step 111, selecting a matching protective response action or activity (e.g., an electromagnetic jammer profile suitable to jam a signal in a zone of interest, alter autopilot/disengage vehicle autopilot, project a hazard warning/avoidance warning) from a library of a plurality of protection response actions or activities stored on a second storage medium mounted on the MCV 5 coupled with a second processor based upon matching one or more of said first elements with one or more second elements (e.g., a warning identifier code, electromagnetic patterns, optical image patterns, thermal image patterns) corresponding to the library of protection response actions or activities.

Referring to FIG. 8, a continuation of the FIG. 7 exemplary method for operating the exemplary embodiment of the RICSAARS, at step 113, optional, determining to avoid or continue on said predetermined route of travel based upon a match or no match of the first and second elements, wherein an altered route of travel will be determined to entirely avoid said effective range of said condition of interest when no matching protective response action or activity is selected. At step 115, transmitting the plurality of sensor output, the warning signal, and the protective response action or activity to a display showing a graphical user interface, wherein said graphical user interface displays a visual representation of the plurality or sensor output and selected matching protective response action or activity to an operator onboard said MCV 5, and permit the operator to input a plurality of control actions (e.g., manually alter or modify the operation of a reconfigurable response system, generate the altered route of travel). At step 117, transmitting the matching protective response action or activity data to a reconfigurable response system (e.g. autopilot, electromagnetic frequency jammer) affixed to said MCV 5, wherein said matching protective response action or activity data includes a plurality of machine readable reconfiguring instructions or signals configured to program and/or operate reconfigurable response system to defeat or avoid a detected condition of interest. At step 119, altering or modifying an operation or function of the reconfigurable response system to respond based on a plurality of machine readable reconfiguring instructions or signals that defeat or destroy said detected condition of interest to be encountered by said MCV 5 based upon said protective response action or activity.

Figure 9:
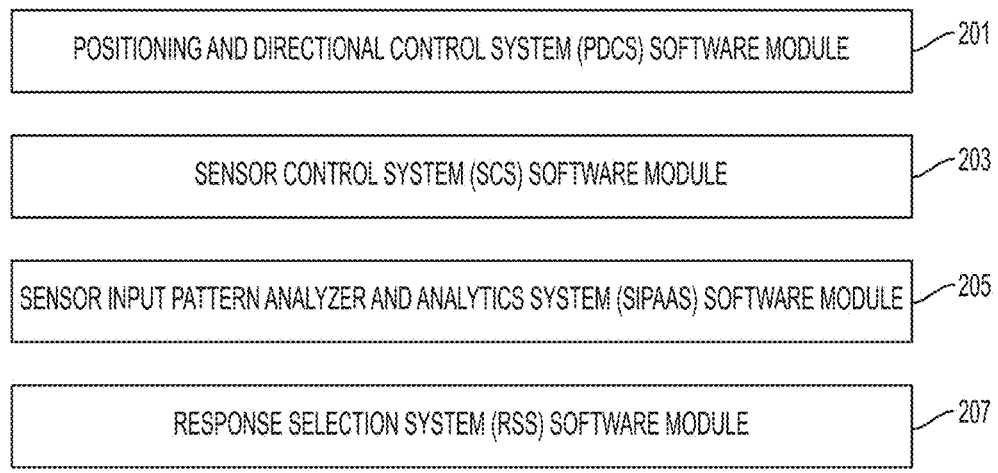
FIG. 9 shows exemplary high level software modules for operating the exemplary embodiment of RICSAARS.

Referring to FIG. 9, software modules can be provided for implementing needed functionality of various embodiments of the invention which are executed by systems on board the MCV 5 and UMRV 1. For example, a positioning and directional control system (PDCS) software module 201 stored on first storage medium 63 can provide instructions to the PPDDCS 35 that operates and controls maneuvering and moving the UMRV 1 along a predetermined route of travel, and maintaining a predetermined distance ahead of the MCV 5. A PDCS user input (PDCSUI) software module 201 stored on the second storage medium 67 on the MCV 5 can also include machine readable instructions that generate a user interface on display 71 in the MCV 5 to enable input or alter the predetermined distance and specify route data that is transmitted by systems onboard MCV 5 to the PDCS software module 201 used to control the UMRV 1 movement and maneuvering. Alternative embodiments can include variants that permit such route and distance inputs from a cloud to the PDCS software module 201 as well. The predetermined distance can include a minimum distance required for the MCV 5 to defeat or avoid a sensor detectable pattern or a condition of interest (e.g., a road side bomb with a cell phone trigger, a destructive traffic/road/electromagnetic environment autopilot disruptive conditions that could interfere with autopilot functions) detected by a plurality of sensors affixed to the UMRV 1 prior to the MCV 5 entering an effective range (e.g., a blast radius, an electromagnetic interference) of the condition of interest. When loss of communication between the UMRV 1 and MCV 5 occurs, instructions in the PDCS software module 201 can direct the UMRV 1 to move towards the MCV 5 or along a previously predicted MCV travel path to attempt to locate the MCV 5. Further instructions can direct the UMRV 1 to land on the MCV 5 if communications cannot be restored after locating the MCV 5 (e.g., the MCV's sensors are knocked out). If the UMRV 1 is unable to locate the MCV 5, the UMRV 1 can travel to a predesignated landing location, a different control vehicle, or an alternative target designated through the cloud network. A sensor control system (SCS) software module 203, operating the plurality of sensors coupled with a first control system (e.g., a processor and a storage medium) onboard the UMRV 1 to collect a plurality of sensor output on or near (e.g., in front of or above the MCV 5) the predetermined route of travel to be analyzed by the first control system 61, 63. A sensor input pattern analyzer and analytics system (SIPAAS) software module 205, such as an artificial intelligence system (e.g., rule base and rule engine) can be stored in the first storage medium 63 that has expert system rules or programs that receives, analyzes, and matches the plurality of sensor output (e.g., electromagnetic spectrum patterns/visual patterns/thermal patterns) with one or more stored condition of interest data profiles (e.g., rule library) on the first storage medium 63 (or from a cloud) that is coupled with a first processor 61. The SIPAAS software module 205 further includes software routines that operates UMRV 1 first communication system 43 upon matching sensor inputs with one or more rules or programs in the SIPAAS library and transmits a warning signal to MCV 5. Such matching of sensor inputs with one or more rules or programs can be based upon matching of at least one of the plurality of sensor output with one or more the stored condition of interest profiles (e.g. rules), wherein the exemplary warning signal includes a plurality of first warning signal elements data (e.g., a warning identifier code, electromagnetic patterns, optical image patterns, thermal image patterns). The SIPAAS software module 205 can further include processing routines that optionally or selectively operate UMRV 1 first processor 61 to, selectively transmit the warning signal and/or the plurality of sensor output using the first communication system 43 (e.g., a transmitter) on the UMRV 1 or alternatively such first warning signal data can be transmitted to the cloud via the second communication system 47 on the MCV 5 for further analysis by a remote source (e.g., a data analysis remote network). In addition to transmitting warnings, the SIPAAS software module 205 can automatically direct the UMRV 1 to avoid conditions of interest or hazards which may threaten the UMRV 1 directly. Examples include camera sensors detecting nearby obstacles (e.g., trees, power lines) or muzzle flashes from unknown firearms (e.g. hunters, disgruntled land owners), audio sensors detecting concussive sounds (e.g., explosions, gunshots), and thermal image sensors detecting excessive heat signatures (e.g., fires, explosions). A Response Selection System (RSS) software module 207 stored on the second recording medium 67 operates or reprograms MCV 5 on board equipment selecting one of a matching protective response action or activity library data (e.g., an electromagnetic jammer profile suitable to jam a signal in a zone of interest, alter autopilot/disengage vehicle autopilot, project a hazard warning/avoidance warning) from a library of a plurality of protection response actions or activities that are a part of, accessible by, or the within RSS software module 207 stored in the second storage medium 67 mounted on the MCV 5 (or accessible through the cloud) coupled with a second processor 65 based upon matching one or more of said first warning signal elements data (e.g. rules or profiles) with one or more second warning signal elements data (e.g., a warning identifier code, electromagnetic patterns, optical image patterns, thermal image patterns) stored in each of the library of protection response actions or activities in the RSS software module 207. In other words, embodiments of the invention having (e.g., RSS software module 207 that have the rule base or library) at least some of the rule base or library data has elements and some of those elements include second warning signal elements data which are used by the RSS software module 207 to match incoming first warning signal elements data and then trigger machine readable instructions or data outputs which reprogram or operate MCV 5 on board systems in response to the warning signal where such reprogramming or operations include loading warning signal specific jamming system programs, autopilot systems, etc. The RSS software module 207 can further include machine instructions (e.g., rules or response option suggestions) that are displayed to a user for manual selection or automatically executed (e.g. for autopilot systems on the MCV 5) to avoid or continue on the predetermined route of travel based upon a match or no match of the first and second elements. In some embodiments, RSS software module 207, can override autopilot systems to input an altered route of travel to entirely avoid or stay out of a predetermined or stored (or input from cloud) effective range of the condition of interest associated with such a first and second warning signal data when no matching protective response action or activity is selected by a user, the RSS software module 207 is available. The RSS software module 207 can generate a user input (UI) system which enable a user to input route selection parameters such as avoid or take certain types of roads, avoid certain structures (e.g., a particular building, type of structure (e.g., hazard such as a building in too close proximity to route of travel, fuel tank next to a road), locations of high incidents of hazards (e.g., repeated explosive or small arms attacks), adverse or poor road conditions, large vehicles that can be used as a means to hide large explosives that are abandoned on a route, terrain/structure combinations which provide ideal ambush locations, weather hazards, road damage, wildfires, urban riots, flood conditions or threats, collapsing structures, etc.) as well as UI route selections which encourage the system to select routes which are safer such as locations which are known safe areas, police stations, etc. including via map our route waypoints. RSS software module 207 can further include machine instructions that, transmit the plurality of sensor output, the second warning signal data and its associated text description, and the protective response action or activity rule or profile selected by the RSS software module 207 to a display showing a graphical user interface. In at least some embodiments, the graphical user interface displays a visual representation of at least some of the plurality of sensor output and selected matching protective response action or activity to an operator onboard said MCV 5, and permit the operator to input a plurality of control actions (e.g., manually alter or modify the operation of a reconfigurable response system, generate the altered route of travel).

Alternative embodiments of the invention can include software routines or modules as well as additional equipment on the UMRV 1 which can directly warn operators on the MCV 5 such as a flare system which can drop flares on the condition of interest ahead of the MCV 5 to provide visual warnings. The UMRV 1 can also include software modules and hardware to aim a light or laser at such a condition of interest to provide additional warnings where the MCV 5 can include an optical system which can detect and display the light or laser on a heads up display or the MCV 5 onboard display and graphical user interface to provide a secondary warning system for an MCV 5 operator.

Although the invention has been described in detail with reference to certain preferred embodiments, variations and modifications exist within the spirit and scope of the invention as described and defined in the following claims.

The invention claimed is:

1. A Remote Information Collection, Situational Awareness, and Adaptive Response System (RICSAARS) comprising:
   a first mobile platform comprising:
      a first communication system,
      a first position determination and navigation system (PDNS) configured to determine the first mobile platform's position and output position data, and
      a reconfigurable control and situational awareness system (RCSAS) configured to generate RCSAS data comprising a first and second RCSAS data in response to an operator's input, wherein the first RCSAS data comprises movement control instructions for a second mobile platform and the second RCSAS data comprises sensor control instructions for the second mobile platform; and
   the second mobile platform comprising:
      a second communication system,
      a movement control system configured to maneuver the second mobile platform within a first predetermined distance from the first mobile platform in proximity of a first designated route of travel,
      a second PDNS configured to determine the second mobile platform's position and output position data, and a sensor system configured to detect at least one of one or more detectable emissions, at least one optical pattern, or characteristics of the environment surrounding the second mobile platform and further configured to identify a first plurality of conditions of interest in an area within a second predetermined distance and proximity to the first designated route of travel to generate sensor output data;

wherein the first and second communication systems are configured to transfer the sensor output data from the sensor system to the RCSAS, selectively transfer the first plurality of RCSAS data from the RCSAS to the movement system, and selectively transfer the second plurality of RCSAS data from the RCSAS to the sensor system;

wherein the movement control system is further configured to read the first plurality of RCSAS data to reconfigure the movement control system to maneuver the second mobile platform within a third predetermined distance from the first mobile platform in proximity of a second designated route of travel;

wherein the sensor system is further configured to read the second plurality of RCSAS data to reconfigure the sensor system to identify a second plurality of conditions of interest within a fourth predetermined distance from the first mobile platform in proximity of the second designated route of travel;

wherein the first communication system is electronically coupled to the RCSAS and the first PDNS, wherein the second communication system is electronically coupled to the sensor system, the movement control system, and the second PDNS.

2. The Remote Information Collection, Situational Awareness, and Adaptive Response System (RICSAARS) of claim 1, wherein the first mobile platform further comprises:

a reconfigurable control system comprising a transmitter configured to interact with, override or jam, or interfere with a first and second plurality of external receivers and control systems (ERCS) within a predetermined radius of the first mobile platform, wherein each of the first and second plurality of ERCS is associated with one or more detectable emissions, at least one optical pattern, or characteristics including conditions of terrain or area surrounding at least one of said first or second plurality of ERCS, wherein the first plurality of ERCS also have one or more of a first plurality of predetermined or known operating configurations, wherein the reconfigurable control system further comprises a plurality of loadset instructions comprising a first plurality of loadset instructions operable to operate the reconfigurable control system to interact with, control, or interfere with said first plurality of ERCS;

wherein the reconfigurable control and situational awareness system (RCSAS) is further configured to generate RCSAS data comprising a third RCSAS data comprising a second plurality of loadset instructions, wherein said RCSAS selectively replaces or alters said first plurality of loadset instructions to create said second plurality of loadset instructions configured to alter operation of the reconfigurable control system to enable a first plurality of responses or a second plurality of responses respectively to the first and second plurality of ERCS, wherein said first plurality of responses respectively comprises interaction with, jamming, or interference with ones of said second plurality of ERCS having one or more of a second plurality of operating configurations that operate respective second plurality of ERCS differently than said first plurality of ERCS;

wherein the RCSAS is electronically coupled to the reconfigurable control system.

3. The Remote Information Collection, Situational Awareness, and Adaptive Response System (RICSAARS) of claim 1, wherein the sensor system comprises:

an electronic magnetic spectrum scanning device,
an optical video camera, and
a thermal sensing device.

4. The Remote Information Collection, Situational Awareness, and Adaptive Response System (RICSAARS) of claim 1, wherein the transmission of data between the first communication system and the second communication system uses a radio frequency (RF) system or a laser communication data transfer system that permits line of sight (LOS) interfaces.

5. The Remote Information Collection, Situational Awareness, and Adaptive Response System (RICSAARS) of claim 1, wherein the RCSAS comprises a graphical user interface (GUI) configured to display key information related to the first plurality of conditions of interest, wherein the operator uses the GUI to generate RCSAS data in the RCSAS.

6. The Remote Information Collection, Situational Awareness, and Adaptive Response System (RICSAARS) of claim 5, wherein the GUI is further configured to display an interactive geospatial map, wherein the interactive geospatial map comprises a pre-made map of an area within a fifth predetermined distance of the first designated route of travel, wherein the interactive geospatial map plots condition of interest indicators onto the map at locations representing where the first and second pluralities of conditions of interest were detected by the sensor system, wherein the GUI is further configured to allow the operator to manually add or remove condition of interest indicators to the interactive geospatial map.

7. The Remote Information Collection, Situational Awareness, and Adaptive Response System (RICSAARS) of claim 6, wherein the first mobile platform further comprises a virtual reality difference identification (VRDI) system comprising a virtual reality headset and a movement tracking system, wherein the virtual reality headset is configured to display a virtual field of view comprising a plurality of images and the condition of interest indicators, wherein the condition of interest indicators are superimposed over the plurality of images, wherein the movement tracking system is configured to detect when the operator moves his field of view and adjust the virtual field of view by a predetermined amount corresponding to the operator's movement.

8. The Remote Information Collection, Situational Awareness, and Adaptive Response System (RICSAARS) of claim 6, wherein the GUI displays the first and second routes of travel.

9. A Remote Information Collection, Situational Awareness, and Adaptive Response System (RICSAARS) comprising:

a mobile platform comprising:
a reconfigurable control and situational awareness system (RCSAS) configured to receive a plurality of inputs from a plurality of sources, process said plurality of inputs, generate a plurality of outputs, and transmit said plurality of outputs to a plurality of systems or subsystems;
a lifting, propulsion, and directional control mechanism,
a sensor system is mounted to an unmanned aerial vehicle and comprising:

an electronic magnetic spectrum scanning device,
an optical video camera, and
a thermal sensing device;
a distribution network configured to transmit a plurality of sensor data and a plurality of images collected by said sensor system to said RCSAS,
a graphic user interface configured to receive said plurality of outputs from said RCSAS and display a plurality of visual images and a visual representation of said plurality of sensor data to provide an operator with information associated with an environment of a path of intended travel,
a plurality of systems or subsystems configured to receive said plurality of outputs from said RCSAS, wherein said plurality of systems or subsystems are configured to automatically modify or adjust said plurality of systems or subsystems in response to a conditions of interest, or require user inputs to modify or adjust said plurality of systems or subsystems in response to the conditions of interest, and
a reconfigurable control system comprising a transmitter configured to interact with, override or jam, or interfere with a first and second plurality of external receivers and control systems (ERCS) within a predetermined radius of the first mobile platform, wherein each of the first and second plurality of ERCS is associated with one or more detectable emissions, at least one optical pattern, or characteristics including conditions of terrain or area surrounding at least one of said first or second plurality of ERCS, wherein the first plurality of ERCS also have one or more of a first plurality of predetermined or known operating configurations, wherein the reconfigurable control system further comprises a plurality of loadset instructions comprising a first plurality of loadset instructions operable to operate the reconfigurable control system to interact with, control, or interfere with said first plurality of ERCS;
wherein the reconfigurable control and situational awareness system (RCSAS) is further configured to generate a second plurality of loadset instructions, wherein said RCSAS selectively replaces or alters said first plurality of loadset instructions to create said second plurality of loadset instructions configured to alter operation of the reconfigurable control system to enable a first plurality of responses or a second plurality of responses respectively to the first and second plurality of ERCS, wherein said first plurality of responses respectively comprises interaction with, jamming, or interference with ones of said second plurality of ERCS having one or more of a second plurality of operating configurations that operate respective second plurality of ERCS differently than said first plurality of ERCS.

10. A Remote Information Collection, Situational Awareness, and Adaptive Response System (RICSAARS) comprising:
a first and second mobile vehicle, wherein the first mobile vehicle comprises:
a propulsion system and directional control system configured to navigate and maneuver the first mobile vehicle along a route to be traveled by the second mobile vehicle and maintain a first predetermined distance ahead of the second mobile vehicle, wherein movement of the first mobile vehicle is controlled autonomously by a first processor or remotely by an operator in the second mobile vehicle,
a first position determination and navigation system (PDNS) configured to determine the first mobile vehicle position and output position data,
a first processor and a first storage medium configured to store and execute a plurality of machine readable instructions, wherein the first processor is further configured to analyze and distribute a plurality of sensor data,
a first communication system configured to transmit a first plurality of electronic signals to a second communication system and receive a second plurality of electronic signals from a second communication system, wherein the first plurality of electronic signals comprises the plurality of sensor data, and
a plurality of sensors configured to detect a plurality of conditions of interest along the route to be traveled by the second mobile vehicle and generate the plurality of sensor data, wherein the plurality of sensors are electronically coupled with the first processor, wherein the plurality of sensors comprises of an electronic magnetic spectrum scanning device configured to detect a plurality of electromagnetic frequencies, an optical video camera configured to capture a plurality of images, and a thermal sensing device configured to capture a plurality of thermal images;
wherein the second mobile vehicle comprises:
a second propulsion system and directional control system configured to enable movement of the second mobile vehicle along a route of travel,
a second PDNS configured to determine the first mobile vehicle position and output position data,
a second processor and a second storage medium configured to store and execute a plurality of machine readable instruction, wherein the second processor is coupled with the second communication system and further configured to analyze the plurality of sensor data to detect the plurality of conditions of interest,
a second communication system configured to transmit a second plurality of electronic signals to the first mobile vehicle, and receive the first plurality of electronic signals from the first mobile vehicle,
a third communication system configured to transmit and receive a third plurality of electronic signals with a cloud network, wherein the cloud network is configured to further process and analyze the plurality of sensor data,
a graphical user interface (GUI) is configured to display the plurality of images, the plurality of thermal images, the plurality of sensor data, and the plurality of conditions of interest with corresponding condition of interest indicators, wherein the graphical user interface is further configured to enable the operator to manually alter or modify an operation or function of a plurality of reconfigurable subsystems, the first mobile vehicle, or the plurality of sensors, wherein the GUI is further configured to display an interactive geospatial map,
a reconfigurable system coupled with the second processor and configured to permit the processor to autonomously execute a plurality of machine readable instructions to alter or modify an operation or function of the reconfigurable system when the plurality of condition(s) of interest are detected within the plurality of sensor data, a virtual reality difference identification (VRDI) system comprising a virtual reality headset and a movement tracking system, wherein the virtual reality headset is configured to display a virtual field of view comprising the plurality of images, the plurality of thermal images, the plurality of sensor data, the plurality of conditions of interest such that condition of interest indicators are superimposed over the plurality of images and plurality of thermal images, wherein the movement tracking system is configured to detect when the operator moves his field of view and adjust the virtual field of view by a predetermined amount corresponding to the operator's movement, and a reconfigurable control system comprising a transmitter configured to interact with, override or jam, or interfere with a first and second plurality of external receivers and control systems (ERCS) within a predetermined radius of the first mobile vehicle, wherein each of the first and second plurality of ERCS is associated with one or more detectable emissions, at least one optical pattern, or characteristics including conditions of terrain or area surrounding at least one of said first or second plurality of ERCS, wherein the first plurality of ERCS also have one or more of a first plurality of predetermined or known operating configurations, wherein the reconfigurable control system further comprises a plurality of loadset instructions comprising a first plurality of loadset instructions operable to operate the reconfigurable control system to interact with, control, or interfere with said first plurality of ERCS;

wherein the reconfigurable control and situational awareness system (RCSAS) is further configured to generate a second plurality of loadset instructions, wherein said RCSAS selectively replaces or alters said first plurality of loadset instructions to create said second plurality of loadset instructions configured to alter operation of the reconfigurable control system to enable a first plurality of responses or a second plurality of responses respectively to the first and second plurality of ERCS, wherein said first plurality of responses respectively comprises interaction with, jamming, or interference with ones of said second plurality of ERCS having one or more of a second plurality of operating configurations that operate respective second plurality of ERCS differently than said first plurality of ERCS;

wherein the first and second plurality of signals are transmitted between first and second communication systems with a plurality of RF signals and optical communication lasers;

wherein the first processor is further configured to generate a plurality of avoidance machine readable instructions comprising instructions for maneuvering to avoid lights and sounds consistent with known hazards recorded in the first storage medium and cloud network, obstacles, terrain, and fire, wherein the first processor is further configured to execute the avoidance machine readable instructions through the propulsion system and directional control system;

wherein the interactive geospatial map comprises a premade map of an area within a second predetermined distance of the route of travel, wherein the interactive geospatial map plots the condition of interest indicators onto the map at locations representing where the conditions of interest were detected by the plurality of sensors, wherein the operator can manually add or remove condition of interest indicators to the interactive geospatial map;

wherein the GUI displays the first and second routes of travel.

11. A method of operating a Remote Information Collection, Situational Awareness, and Adaptive Response System (RICSAARS) comprising:

maneuvering and moving an unmanned mobile scout vehicle along a predetermined route of travel, and maintaining a predetermined distance ahead of a mobile control vehicle, wherein the predetermined distance includes a minimum distance required for the mobile control vehicle to defeat or avoid a sensor detectable pattern or a condition of interest detected by a plurality of sensors affixed to the unmanned mobile scout vehicle prior to the mobile control vehicle entering a predetermined effective range of the detected condition of interest;

operating the plurality of sensors coupled with a first control system onboard the unmanned mobile scout vehicle to collect a plurality of sensor output on or near the predetermined route of travel to be analyzed by the first control system;

analyzing and matching the plurality of sensor output with one or more stored condition of interest data profiles on a first storage medium coupled with a first processor;

transmitting a warning signal using a transmitter on the unmanned mobile scout vehicle to a receiver on the mobile control vehicle based upon matching of at least one of the plurality of sensor output with one or more the stored condition of interest profiles, wherein the warning signal includes a plurality first elements;

selectively, transmitting said warning signal or the plurality of sensor output using said transmitter on said unmanned mobile scout vehicle or a transmitter on said mobile control vehicle to a cloud network for further analysis by a remote source;

selecting a matching protective response action or activity from a library of a plurality of protection response actions or activities stored on a second storage medium mounted on said mobile control vehicle coupled with a second processor based upon matching one or more of said plurality of first elements with one or more of a plurality second elements corresponding to said library of protection response actions or activities;

transmitting said plurality of sensor output, said warning signal, and said matching protective response action or activity to a display showing a graphical user interface, wherein said graphical user interface displays a visual representation of said plurality or sensor output and matching protective response action or activity to an operator onboard said mobile control vehicle, and permit said operator to input a plurality of control actions;

transmitting said matching protective response action or activity data to a reconfigurable response system affixed to said mobile control vehicle, wherein said matching protective response action or activity data includes a plurality of machine readable reconfiguring instructions or signals configured to program and/or operate said reconfigurable response system to defeat or avoid a detected condition of interest; and altering or modifying an operation or function of said reconfigurable response system to respond based on a plurality of machine readable reconfiguring instructions or signals that defeat or destroy said detected condition of interest to be encountered by said mobile control vehicle based upon said protective response action or activity.

12. A method of claim 11, wherein said sensor detectable pattern or condition of interest includes a road side bomb with a triggering mechanism, or a destructive traffic/road/electromagnetic environment autopilot disruptive conditions that could interfere with autopilot functions.

13. A method of claim 11, wherein said predetermined effective range includes a blast radius of an explosive device or an area where electromagnetic interference would occur.

14. A method of claim 11, wherein said plurality of sensor output includes an electromagnetic spectrum pattern, an image pattern, or a thermal pattern.

15. A method of claim 11, wherein a protective response action or activity includes an electromagnetic jammer profile suitable to jam a signal in a zone of interest, alter an autopilot function, disengage a vehicle's autopilot system, or produce a hazard warning indication to alert the operator of a condition of interest.

16. A method of claim 11, wherein said first and second elements associated with said warning signal and said protective response action or activity, respectively, comprises a warning identifier code, electromagnetic patterns, optical image patterns, and thermal image patterns.

17. A method of claim 11, further comprising:
determining to avoid or continue on said predetermined route of travel based upon a match or no match of said plurality of first and second elements, wherein an altered route of travel will entirely avoid said predetermined effective range of said condition of interest when no matching protective response action or activity is selected.

* * * * *